(12) United States Patent
Strobel et al.

(10) Patent No.: US 9,382,374 B2
(45) Date of Patent: Jul. 5, 2016

(54) LIQUID HARDENERS FOR HARDENING EPOXIDE RESINS (II)

(71) Applicant: ALZCHEM AG, Trostberg (DE)

(72) Inventors: Sylvia Strobel, Garching (DE); Martin Ebner, Kissing (DE); Florian Ritzinger, Garching (DE); Hans-Peter Krimmer, Kirchweidach (DE)

(73) Assignee: ALZCHEM AG, Trostberg (DE)

(*) Notice: Subject to any disclaimer, the term of this patent is extended or adjusted under 35 U.S.C. 154(b) by 0 days.

(21) Appl. No.: 14/418,227

(22) PCT Filed: Jul. 31, 2013

(86) PCT No.: PCT/EP2013/066102
§ 371 (c)(1),
(2) Date: Jan. 29, 2015

(87) PCT Pub. No.: WO2014/020072
PCT Pub. Date: Feb. 6, 2014

(65) Prior Publication Data
US 2015/0158970 A1 Jun. 11, 2015

(30) Foreign Application Priority Data

Aug. 2, 2012 (DE) .......................... 10 2012 015 315
Aug. 2, 2012 (DE) .......................... 10 2012 015 316

(51) Int. Cl.
| | |
|---|---|
| B32B 27/04 | (2006.01) |
| B32B 27/38 | (2006.01) |
| B32B 27/40 | (2006.01) |
| C08J 5/24 | (2006.01) |
| C08G 18/82 | (2006.01) |
| C08G 59/40 | (2006.01) |
| C08G 59/50 | (2006.01) |
| C08G 59/68 | (2006.01) |
| C08L 63/00 | (2006.01) |
| C08L 75/04 | (2006.01) |
| C08G 59/14 | (2006.01) |
| C08K 5/00 | (2006.01) |
| C08G 71/04 | (2006.01) |
| C08J 5/04 | (2006.01) |

(52) U.S. Cl.
CPC ............ *C08G 59/1477* (2013.01); *C08G 18/82* (2013.01); *C08G 59/4014* (2013.01); *C08G 59/4021* (2013.01); *C08G 71/04* (2013.01); *C08J 5/043* (2013.01); *C08K 5/00* (2013.01); *C08L 63/00* (2013.01); *C08L 75/04* (2013.01); *C08J 2363/00* (2013.01)

(58) Field of Classification Search
USPC ................ 523/428; 528/85; 428/297.4, 423.1
See application file for complete search history.

(56) References Cited

U.S. PATENT DOCUMENTS

| | | | |
|---|---|---|---|
| 3,624,178 A | 11/1971 | Lohse et al. | |
| 4,126,664 A | 11/1978 | Weiss | |
| 4,562,289 A * | 12/1985 | Hajek ................ | C08G 18/3838 252/182.13 |
| 4,677,170 A | 6/1987 | Monnier et al. | |
| 4,912,190 A * | 3/1990 | Schafer ............. | C08G 59/4014 528/102 |
| 4,933,422 A * | 6/1990 | Hammer ............ | C08G 59/686 528/117 |
| 5,407,977 A | 4/1995 | Everett et al. | |
| 5,424,373 A | 6/1995 | Flury et al. | |
| 5,429,831 A | 7/1995 | Williams et al. | |
| 5,512,372 A | 4/1996 | Blanc et al. | |
| 6,410,127 B1 | 6/2002 | Sawaoka et al. | |
| 2004/0147711 A1 | 7/2004 | Christiansen et al. | |
| 2006/0106168 A1 | 5/2006 | Ota et al. | |
| 2007/0027274 A1 | 2/2007 | Antelmann et al. | |
| 2008/0081170 A1 | 4/2008 | Tilbrook et al. | |
| 2012/0208925 A1 | 8/2012 | Hitzler et al. | |
| 2013/0079488 A1 | 3/2013 | Hitzler et al. | |
| 2013/0323429 A1 | 12/2013 | Strobel et al. | |
| 2014/0024741 A1 | 1/2014 | Strobel et al. | |
| 2015/0158972 A1* | 6/2015 | Strobel ................. | C08J 5/043 523/466 |

FOREIGN PATENT DOCUMENTS

| | | | | |
|---|---|---|---|---|
| AT | 351772 | | 8/1979 | |
| AU | 705375 | | 5/1999 | |
| CA | 2145590 | | 9/1995 | |
| CA | 2816725 A1 * | | 8/2012 | ............ C08G 59/44 |
| CA | 2827002 A1 * | | 8/2012 | ............ C08G 59/44 |
| CN | 1513893 | | 7/2004 | |
| CN | 1717427 | | 1/2006 | |
| CN | 1798787 | | 2/2007 | |
| CN | 101240154 | | 8/2008 | |
| DE | 2459752 | | 7/1976 | |
| DE | 2743015 | | 4/1979 | |
| DE | 3540524 | | 5/1987 | |
| DE | 4026363 | | 3/1992 | |
| DE | 69613479 | | 4/2002 | |
| DE | 69331759 | | 1/2003 | |
| DE | 102006012550 A1 | | 9/2007 | |
| DE | 102009052061 | | 5/2011 | |

(Continued)

OTHER PUBLICATIONS

Machine translation of DE 2743015 A1 (no date).*

(Continued)

*Primary Examiner* — Michael J Feely

(74) *Attorney, Agent, or Firm* — Kilpatrick Townsend & Stockton LLP

(57) ABSTRACT

The present invention relates to novel liquid hardeners for hardening hardenable polymer resins, particularly epoxide resins, and epoxide resin compositions and to the use thereof for producing composite fiber materials.

20 Claims, No Drawings

(56) References Cited

FOREIGN PATENT DOCUMENTS

| | | |
|---|---|---|
| DE | 102010020882 | 11/2011 |
| DE | 102011012079 | 8/2012 |
| EP | 0108712 | 5/1984 |
| EP | 0196077 | 10/1986 |
| EP | 0204658 | 12/1986 |
| EP | 0429395 | 5/1991 |
| EP | 0639599 | 2/1995 |
| EP | 0658584 | 6/1995 |
| EP | 0675143 | 1/2002 |
| EP | 1996641 | 10/2009 |
| GB | 2247237 | 5/1994 |
| JP | 60069126 A | 4/1985 |
| WO | 2004050739 | 6/2004 |
| WO | 2004106402 | 12/2004 |
| WO | 2007062853 | 6/2007 |
| WO | 2007107288 | 9/2007 |
| WO | 2011054945 | 5/2011 |
| WO | 2011134168 | 11/2011 |
| WO | 2011144659 | 11/2011 |
| WO | 2012113878 | 8/2012 |
| WO | WO 2012/113879 A1 * 8/2012 ............. C08G 59/44 |

OTHER PUBLICATIONS

International Application No. PCT/EP2013/066102, English translation of International Preliminary Report on Patentability dated Feb. 2, 2015.
International Application No. PCT/EP2013/066078, International Search Report mailed Mar. 27, 2014, 7 pages.
Scifinder cyanamide properties, 2014, 3 pages.
U.S. Appl. No. 13/983,935 , "Non-Final Office Action", Jan. 23, 2015, 26 pages.
U.S. Appl. No. 14/000,992 , "Final Office Action", Jun. 10, 2015, 35 pages.
U.S. Appl. No. 14/000,992 , "Non-Final Office Action", Oct. 23, 2014, 25 Pages.
U.S. Appl. No. 14/000,992 , "Non-Final Office Action", Oct. 29, 2013, 25 pages.
International Application No. PCT/EP2012/053092, International Search Report dated Jun. 8, 2012, 4 pages.
International Application No. PCT/EP2013/066078, English Translation of International Preliminary Report on Patentability dated Feb. 12, 2015, 6 pages.
German Patent Application No. 102012015315.5, Search Report dated Apr. 4, 2013.
German Patent Application No. 102012015316.3, Search Report dated Apr. 4, 2013.
International Patent Application No. PCT/EP2013/066102, International Search Report dated Mar. 31, 2014.
Huang et al. (1989) Studies on the Characterization of Ureas as Latent Accelerators for Dicyandiamide-Cured Epoxy Resin, Acta Polymerica Sinica; No. 3, 329-336.
Final Office Action dated Jul. 7, 2015, in U.S. Appl. No. 13/983,935, 53 pages.
Non-Final Office Action in related U.S. Appl. No. 13/983,935, Nov. 12, 2015, 67 pages.
Office Action in related Japanese Application No. 2013-554899, Aug. 19, 2015, 2 pages.
U.S. Appl. No. 14/000,992, Notice of Allowance, Dec. 9, 2015, 10 pages.
U.S. Appl. No. 14/407,232, Non-Final Office Action, Dec. 4, 2015, 43 pages.
U.S. Appl. No. 14/955,828, "Non-Final Office Action", Jan. 15, 2016, 41 pages.
U.S. Appl. No. 13/983,935, Final Office Action, mailed Apr. 26, 2016, 74 pages.

* cited by examiner ing according to the energy input. Dicyandiamide, for example, is a particularly suitable and also inexpensive curing agent for such one-component epoxy resin formulations. Under ambient conditions, corresponding resin/curing agent mixtures can be stored ready for use for up to twelve (12) months.

LIQUID HARDENERS FOR HARDENING EPOXIDE RESINS (II)

PRIOR RELATED APPLICATIONS

This application is a National Phase application of International Application No. PCT/EP2013/066102, filed Jul. 31, 2012, which claims priority to German Application No. 10 2012 015 316.3, filed Aug. 2, 2012, and German Application No. 10 2012 015 315.5, filed Aug. 2, 2012, each of which is incorporated herein by reference in its entirety.

The present invention relates to novel liquid curing agents for curing curable polymer resins, in particular epoxy resins, and to epoxy resin compositions comprising these curing agents for the production of fibre composites.

The use of duroplastic epoxy resins is widespread on account of their good resistance to chemicals, their very good thermal and dynamic mechanical properties and their high electrical insulating capacity. In addition, epoxy resins exhibit good adhesion to many substrates and are accordingly highly suitable for use in fibre composites. For use in fibre composites, both good wetting of the fibres, that is to say a low viscosity of the resin formulation chosen for producing the composite, and high mechanical properties after curing are desirable.

Various processes are used for producing mouldings from fibre composites, such as, for example, the prepreg process, various infusion or injection processes, in particular the RTM process (resin transfer moulding). Of those processes, the infusion or injection processes in particular have gained importance in recent years. In the infusion processes, for example, dry reinforcing materials, such as, for example, fibre mats, nonwovens, woven fabrics or knitted fabrics, located in an open tool are covered with a tight vacuum film and, after application of the vacuum, impregnated with resin formulations via delivery channels. These processes have the advantage that large elements with complex geometry can be moulded in a short time.

The epoxy resin formulation for an infusion or injection process must have a low viscosity in order to permit the fibre materials to be impregnated in vacuo within an appropriate time. If resin formulations having too high viscosities are used or if resin formulations are used which generate too high viscosities too quickly during the injection period, unimpregnated portions and other faults are obtained in the resulting composite.

The curing of epoxy resins proceeds by various mechanisms. In addition to curing with phenols or anhydrides, curing is frequently carried out using amines. These substances are mostly liquid and can be mixed very well with epoxy resins. Because of their high reactivity and thus very low latency, such epoxy resin compositions are in two-component form. This means that the resin (A component) and the curing agent (B component) are stored separately and not mixed in the correct ratio until shortly before use. "Latent" means, in this case, that a mixture of the individual components is stable under defined storage conditions. Such two-component resin formulations are also referred to as cold-curing resin formulations, the curing agents used therefor mostly being chosen from the group of the amines or amidoamines.

One-component, hot-curing epoxy resin formulations, on the other hand, are prepackaged in the finished, ready for use state, that is to say the epoxy resin and the curing agent are mixed at the factory. Mixing errors in the individual components upon use on site are therefore excluded. For this, latent curing systems are required which do not react with the epoxy resin at room temperature (are storable) but react readily upon heating according to the energy input. Dicyandiamide, for example, is a particularly suitable and also inexpensive curing agent for such one-component epoxy resin formulations. Under ambient conditions, corresponding resin/curing agent mixtures can be stored ready for use for up to twelve (12) months.

Unfortunately, such epoxy resin mixtures containing highly latent dicyandiamide or other highly latent curing agents have the disadvantage that the curing agents are only slightly soluble in epoxy resins and, in the infusion or injection process for producing fibre composites, are retained and filtered out by the fibre mats at the inlet points for the resin. Homogeneous mixing of the curing agent into the resins in the composite prior to use is accordingly prevented. Curing of the composite as a whole is thereby prevented.

Few proposals for overcoming those disadvantages are described in the patent literature. Both German patent application DE 27 43 015 A1 and Austrian patent AT 351 772 each describe a process for curing epoxy resins using aqueous solutions of cyanamide or a mixture of cyanamide comprising up to 75 wt. % urea. Curing can also be carried out using catalytic amounts of accelerators. Correspondingly produced epoxy resin compositions can be used to produce pre-impregnated glass fibre fabrics, known as prepregs. Accordingly, both these patent documents describe liquid aqueous curing agent solutions. A disadvantage in this case, however, is that the mentioned curing agents are solutions whose solvent, water, must be removed during the curing process if losses of quality of the finished cured moulding are not to be accepted. This disadvantage is independent of the choice of solvent, because these solvents always have to be removed during curing.

Furthermore, unpublished patent applications PCT/EP2012/053092 and PCT/EP2012/053091 describe liquid curing agents for curing curable polymer resins which comprise cyanamide and at least one urea derivative of a given formula.

The object underlying the present invention was to provide novel curing agents for curing curable polymer resins, in particular curable epoxy resins, and also epoxy resin compositions which can be used for producing composites and fibre-reinforced matrices. It was further necessary for such curing agents to combine the advantages of the known amine curing agents and of the known dicyandiamide powder curing agents without inheriting their disadvantages, such as low latency or filtration of the particles. These novel curing agents are to exhibit a high latency, and thus high storage stability below the curing temperature, as well as a high reactivity at the curing temperature, permit complete crosslinking of the epoxy resin, be soluble in or completely miscible with epoxy resins, and be suitable for use in infusion, injection or RTM processes.

Those objects are achieved by liquid curing agents according to claim 1. According to a first embodiment, the present invention accordingly relates to a liquid curing agent for curing polymer resins, in particular curable polymer resins, in particular curable epoxy resins, polyurethane resins and mixtures thereof, which comprises a) cyanamide, b) at least one urea derivative of formula (I), and c) at least one curing accelerator from the class of the imidazolines according to formula (II) or of the imidazoles according to formula (III), wherein the urea derivatives have the following structure Formula (I)

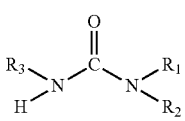

wherein the following apply to the radicals, simultaneously or independently of one another, and at least one radical $R^1$, $R^2$, $R^3$ is different from hydrogen:

$R^1$, $R^2$=simultaneously or independently of one another hydrogen, C1- to C15-alkyl, C3- to C15-cycloalkyl or together, with formation of a ring, C3- to C10-alkylene;

$R^3$=hydrogen, C1- to C15-alkyl, C3- to C15-cycloalkyl, aryl, arylalkyl, C1- to C15-alkyl substituted by —NHC(O)$NR^1R^2$, C3- to C15-cycloalkyl substituted by —NHC(O)$NR^1R^2$, aryl substituted by —NHC(O)$NR^1R^2$, or arylalkyl substituted by —NHC(O)$NR^1R^2$;

and wherein the imidazolines and the imidazoles have the following structure

Formula (II)

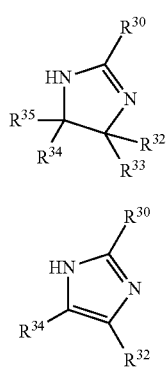

Formula (III)

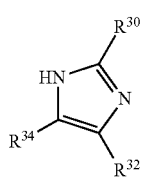

wherein the following apply to the radicals, simultaneously or independently of one another:

$R^{30}$=simultaneously or independently of one another hydrogen, C1- to C15-alkyl, C3- to C15-cycloalkyl, aryl, arylalkyl;

$R^{32}$, $R^{34}$=simultaneously or independently of one another hydrogen, C1- to C15-alkyl, C3- to C15-cycloalkyl or together, with formation of a ring, C3- to C15-alkylene;

$R^{33}$, $R^{35}$=simultaneously or independently of one another hydrogen, C1- to C15-alkyl, C3- to C15-cycloalkyl or together, with formation of a ring, C3- to C15-alkylene.

Essentially to the invention, a liquid curing agent according to the present invention comprises cyanamide (CAS 420-04-2). Surprisingly, it has been found that intensive mixing of cyanamide and at least one urea derivative according to formula (I) having the meanings given above yields liquid to semi-liquid mixtures having low melting points (in comparison with the starting materials), which dissolve completely in or mix completely with epoxy resin at room temperature. Although, by analysis, separate substances are still present, DSC analyses show endothermic melting peaks of one-component systems. These mixtures can be mixed with curing accelerators from the group of the imidazolines (also 4,5-dihydro-1H-imidazoles hereinafter) according to formula (II) or of the imidazoles according to formula (III) without their liquid state being affected and are outstandingly suitable for the curing of polymer resins, in particular of curable polymer resins, in particular curable epoxy resins, curable polyurethane resins or mixtures thereof. Their action in the epoxy resin is comparable to the curing properties of dicyandiamide accelerated with imidazoles and takes place at <100° C. Nevertheless, a latency of from several days to several weeks is maintained at room temperature.

Surprisingly, it has additionally been shown that, in comparison with powder mixtures of the same composition, liquid curing agents according to the invention without exception initiate curing of the polymer resins at lower temperatures and thus permit a shorter time for producing mouldings. In addition, the viscosity of the finished formulated resins, in particular of epoxy resin compositions, is affected only insignificantly by the liquid curing agents according to the invention, as a result of which these curing agents are outstandingly suitable for use in infusion resins, in particular because a considerable time saving is made possible in the production of mouldings. It is to be emphasised that the usual disadvantages of other liquid curing agents, such as a very long latency and thus very high reactivity even at room temperature, are not observed in this case. In addition, high glass transition temperatures can be provided with the resins hardened using the curing agent according to the invention as compared with resins hardened using amine curing agents.

Overall, therefore, a curing agent can be provided which, on account of its high latency in the polymer resin compositions and its high reactivity in the polymer resin compositions at the curing temperature, is outstandingly suitable for use in infusion or injection processes.

In a development of the present invention, it can be provided that the liquid curing agent comprises cyanamide and at least one urea derivative of formula (I) or mixtures of such urea derivatives in a molar ratio cyanamide:urea derivative or urea derivative mixture of from 1:1 to 4:1.

In particular, it is provided according to the present invention that the molar ratio cyanamide: urea derivative or urea derivative mixture is from 1:1 to 3:1 and more preferably from 1:1 to 2:1 and most preferably from 2:1 to 4:1.

In the presence of a curing accelerator from the class of the imidazolines according to formula (II) or of the imidazoles according to formula (III), the molar ratios of cyanamide:urea derivative can also be outside the preferred range of from 1:1 to 4:1. For example, molar ratios of cyanamide:urea derivative of 0.1 to <1:1, in particular 0.2 to <1:1, are possible, as are molar ratios of cyanamide:urea derivative of from >4:1 to 20:1, in particular from >4:1 to 10:1.

A liquid curing agent according to the present invention is to be understood as being a curing agent which has a melting point $S_m$ where $S_m$<20° C. (normal pressure) or is liquid at a temperature of 20° C. (normal pressure) and has a viscosity of less than 1 Pa*s. The liquid curing agents according to the invention preferably have a viscosity of ≤100 mPa*s, more preferably of <20 mPa*s and yet more preferably of ≤12 mPa*s at 25° C. Particular preference is given, however, to those liquid curing agents which have a melting point $S_m$ where $S_m$<10° C. (normal pressure), most preferably a melting point $S_m$ where $S_m$<0° C. (normal pressure), or are liquid at a temperature of 10° C. (normal pressure), most preferably at a temperature of 0° C. (normal pressure), and have a viscosity of less than 1 Pa*s.

It is to be emphasised that these curing agents as such are liquid and in particular, apart from cyanamide, at least one urea derivative or mixtures thereof and at least one curing accelerator from the class of the imidazolines or of the imidazoles, do not comprise any solvents or solubilisers and are thus solvent-free or solubiliser-free. In connection with the present invention, a solvent or solubiliser is to be understood as being any inorganic or organic solvent or solubiliser or mixtures thereof that is used in chemical synthesis or in analysis to produce a solution. Viscosity modifiers according to the present invention are not solvents, however. In connection with the present invention, solvent-free or solubiliser-free is understood as meaning a curing agent which is substantially free of solvents or solubilisers and comprises not more than 1.0 wt. % solvent or solubiliser resulting from its production.

In an alternative embodiment, however, it is also possible for the curing agents to comprise a solvent, in particular water. The addition of solvents in this case is not required to make the mixtures liquid but may be advantageous for other process-related requirements.

Furthermore, in connection with the present invention, C1- to C15-alkyl is to be understood as meaning a linear or branched alkyl radical having a chain length of up to 15 carbon atoms which in particular has the general formula $C_nH_{2n+1}$, in which n=from 1 to 15. It is preferably provided in this case that C1- to C15-alkyl denotes methyl, ethyl, propyl, butyl, pentyl, hexyl, heptyl, octyl, nonyl or decyl, it further being preferable for those alkyl radicals also to be unbranched, mono-branched, poly-branched or alkyl-substituted.

Preference is given to such C1- to C15-alkyl radicals which in turn are alkyl-substituted, in particular substituted by C1- to C5-alkyl, once or more than once. According to the present invention, C1- to C5-alkyl can more preferably denote methyl, ethyl, n-propyl, 1-methylethyl, n-butyl, 1-methylpropyl, 2-methylpropyl, 1,1-dimethylethyl, n-pentyl, 1-methylbutyl, 2-methylbutyl, 3-methylbutyl, 1,1-dimethylpropyl, 1,2-dimethylpropyl, 2,2-dimethylpropyl or 1-ethylpropyl. Accordingly, C1- to C15-alkyl according to the present invention can in particular also denote 1-methylethyl, 1-methylpropyl, 1-methylbutyl, 1-methylpentyl, 1-methylhexyl, 1-methylheptyl, 1-methyloctyl, 1-methylnonyl, 1-methyldecanyl, 1-ethylpropyl, 1-ethylbutyl, 1-ethylpentyl, 1-ethylhexyl, 1-ethylheptyl, 1-ethyloctyl, 1-ethylnonyl, 1-ethyldecanyl, 2-methylpropyl, 2-methylbutyl, 2-methylpentyl, 2-methylhexyl, 2-methylheptyl, 2-methyloctyl, 2-methylnonyl, 2-methyldecanyl, 2-ethylpropyl, 2-ethylbutyl, 2-ethylpentyl, 2-ethylhexyl, 2-ethylheptyl, 2-ethyloctyl, 2-ethylnonyl, 2-ethyldecanyl, 1,1-dimethylethyl, 1,1-dimethylpropyl, 1,1-dimethylbutyl, 1,1-dimethylpentyl, 1,1-dimethylhexyl, 1,1-dimethylheptyl, 1,1-dimethyl-octyl, 1,1-dimethylnonyl, 1,1-dimethyldecanyl, 1,2-dimethylpropyl, 1,2-dimethylbutyl, 1,2-dimethylpentyl, 1,2-dimethylhexyl, 1,2-dimethylheptyl, 1,2-dimethyloctyl, 1,2-dimethylnonyl, 1,2-dimethyldecanyl, 2-ethyl-1-methylbutyl, 2-ethyl-1-methylpentyl, 2-ethyl-1-methylhexyl, 2-ethyl-1-methylheptyl, 2-ethyl-1-methyloctyl, 2-ethyl-1-methylnonyl, 2-ethyl-1-methyldecanyl, 1-ethyl-2-methylpropyl, 1-ethyl-2-methylbutyl, 1-ethyl-2-methylpentyl, 1-ethyl-2-methylhexyl, 1-ethyl-2-methylheptyl, 1-ethyl-2-methyloctyl, 1-ethyl-2-methylnonyl or 1-ethyl-2-methyldecanyl.

More preferably, a C1- to C15-alkyl radical, in particular methyl, ethyl, propyl, butyl, can in turn also be substituted by a C3- to C15-cycloalkyl radical, in which C3- to C15-cycloalkyl has the meaning given below. Accordingly, C1- to C15-alkyl can in particular also denote C3- to C15-cycloalkyl-methyl, 1-(C3- to C15-cycloalkyl)-1-ethyl, 2-(C3- to C15-cycloalkyl)-1-ethyl, 1-(C3- to C15-cycloalkyl)-1-propyl, 2-(C3- to C15-cycloalkyl)-1-propyl or 3-(C3- to C15-cycloalkyl)-1-propyl, in which C3- to C15-cycloalkyl has the meaning given below.

In connection with the present invention, C3- to C15-cycloalkyl is to be understood as meaning a monocyclic or bicyclic cycloalkyl radical having from 3 to 15 carbon atoms, in particular a cycloalkyl radical which has the general formula $C_nH_{2n-1}$, in which n=from 3 to 15. More preferably, C3- to C15-cycloalkyl can denote cyclopropyl, cyclobutyl, cyclopentyl, cyclohexyl or cycloheptyl, it being possible for these cycloalkyl radicals can in turn to also preferably be mono- or poly-substituted by C1- to C5-alkyl radicals having the meaning given above. More preferably, C3- to C15-cycloalkyl can accordingly also denote 1-methyl-1-cyclopropyl, 1-methyl-1-cyclobutyl, 1-methyl-1-cyclopentyl, 1-methyl-1-cyclohexyl, 1-methyl-1-cycloheptyl, 2-methyl-1-cyclopropyl, 2-methyl-1-cyclobutyl, 2-methyl-1-cyclopentyl, 2-methyl-1-cyclohexyl, 2-methyl-1-cycloheptyl, 3-methyl-1-cyclobutyl, 3-methyl-1-cyclopentyl, 3-methyl-1-cyclohexyl, 3-methyl-1-cycloheptyl, 4-methyl-1-cyclohexyl, 4-methyl-1-cycloheptyl, 1,2-dimethyl-1-cyclopropyl, 2,2-dimethyl-1-cyclopropyl, 2,3-dimethyl-1-cyclopropyl, 1,2-dimethyl-1-cyclobutyl, 1,3-dimethyl-1-cyclobutyl, 2,2-dimethyl-1-cyclobutyl, 2,3-dimethyl-1-cyclobutyl, 2,4-dimethyl-1-cyclobutyl, 3,3-dimethyl-1-cyclobutyl, 1,2-dimethyl-1-cyclopentyl, 1,3-dimethyl-1-cyclopentyl, 2,2-dimethyl-1-cyclopentyl, 2,3-dimethyl-1-cyclopentyl, 2,4-dimethyl-1-cyclopentyl, 2,5-dimethyl-1-cyclopentyl, 3,3-dimethyl-1-cyclopentyl, 3,4-dimethyl-1-cyclopentyl, 1,2-dimethyl-1-cyclohexyl, 1,3-dimethyl-1-cyclohexyl, 1,4-dimethyl-1-cyclohexyl, 1,5-dimethyl-1-cyclohexyl, 1,6-dimethyl-1-cyclohexyl, 2,2-dimethyl-1-cyclohexyl, 2,3-dimethyl-1-cyclohexyl, 2,4-dimethyl-1-cyclohexyl, 2,5-dimethyl-1-cyclohexyl, 2,6-dimethyl-1-cyclohexyl, 3,3-dimethyl-1-cyclohexyl, 3,4-dimethyl-1-cyclohexyl, 3,5-dimethyl-1-cyclohexyl, 3,6-dimethyl-1-cyclohexyl, 4,4-dimethyl-1-cyclohexyl, 1,2,2-trimethyl-1-cyclopropyl, 1,2,3-trimethyl-1-cyclopropyl, 1,2,2-trimethyl-1-cyclobutyl, 1,3,3-trimethyl-1-cyclobutyl, 1,2,3-trimethyl-1-cyclobutyl, 2,2,3-trimethyl-1-cyclobutyl, 2,2,4-trimethyl-1-cyclobutyl, 1,2,2-trimethyl-1-cyclopentyl, 1,2,3-trimethyl-1-cyclopentyl, 1,2,4-trimethyl-1-cyclopentyl, 1,2,5-trimethyl-1-cyclopentyl, 1,3,3-trimethyl-1-cyclopentyl, 1,3,4-trimethyl-1-cyclopentyl, 1,3,5-trimethyl-1-cyclopentyl, 2,2,3-trimethyl-1-cyclopentyl, 2,2,4-trimethyl-1-cyclopentyl, 2,2,5-trimethyl-1-cyclopentyl, 2,3,3-trimethyl-1-cyclopentyl, 2,3,4-trimethyl-1-cyclopentyl, 2,3,5-trimethyl-1-cyclopentyl, 2,3,3-trimethyl-1-cyclopentyl, 2,4,4-trimethyl-1-cyclopentyl, 2,4,5-trimethyl-1-cyclopentyl, 2,5,5-trimethyl-1-cyclopentyl, 3,3,4-trimethyl-1-cyclopentyl, 3,3,5-trimethyl-1-cyclopentyl, 3,4,5-trimethyl-1-cyclopentyl, 3,4,4-trimethyl-1-cyclopentyl, 1,2,2-trimethyl-1-cyclohexyl, 1,2,3-trimethyl-1-cyclohexyl, 1,2,4-trimethyl-1-cyclohexyl, 1,2,5-trimethyl-1-cyclohexyl, 1,2,6-trimethyl-1-cyclohexyl, 1,3,3-trimethyl-1-cyclohexyl, 1,3,4-trimethyl-1-cyclohexyl, 1,3,5-trimethyl-1-cyclohexyl, 1,3,6-trimethyl-1-cyclohexyl, 1,4,4-trimethyl-1-cyclohexyl, 2,2,3-trimethyl-1-cyclohexyl, 2,2,4-trimethyl-1-cyclohexyl, 2,2,5-trimethyl-1-cyclohexyl, 2,2,6-trimethyl-1-cyclohexyl, 2,3,3-trimethyl-1-cyclohexyl, 2,3,4-trimethyl-1-cyclohexyl, 2,3,5-trimethyl-1-cyclohexyl, 2,3,6-trimethyl-1-cyclohexyl, 2,4,4-trimethyl-1-cyclohexyl, 2,4,5-trimethyl-1-cyclohexyl, 2,4,6-trimethyl-1-cyclohexyl, 2,5,5-trimethyl-1-cyclohexyl, 2,5,6-trimethyl-1-cyclohexyl, 2,6,6-trimethyl-1-cyclohexyl, 3,3,4-trimethyl-1-cyclohexyl, 3,3,5-trimethyl-1-cyclohexyl, 3,3,6-trimethyl-1-cyclohexyl, 3,4,4-trimethyl-1-cyclohexyl, 3,4,5-trimethyl-1-cyclohexyl, 3,4,6-trimethyl-1-cyclohexyl, 3,5,6-trimethyl-1-cyclohexyl, 1,2,3,3-tetramethyl-1-cyclopropyl, 2,2,3,3-tetramethyl-1-cyclopropyl, 1,2,2,3-tetramethyl-1-cyclopropyl, 1,2,2,3-tetramethyl-1-cyclobutyl, 1,2,3,3-tetramethyl-1-cyclobutyl, 2,2,3,3-tetramethyl-1-cyclobutyl 3,3,4-tetramethyl-1-cyclobutyl, 1,2,2,3-tetramethyl-1-cyclopentyl, 1,2,2,4-tetramethyl-1-cyclopentyl, 1,2,2,5-tetramethyl-1-cyclopentyl, 1,2,3,3-tetramethyl-1-cyclopentyl, 1,2,3,4-tetramethyl-1-cyclopentyl, 1,2,3,5-tetramethyl-1-cyclopentyl, 1,2,5,5-tetramethyl-1-cyclopentyl, 2,2,3,3-tetramethyl-1-cyclopentyl, 2,2,3,3-tetramethyl-1-cyclohexyl, 2,2,4,4-tetramethyl-1-cyclohexyl, 2,2,5,5-tetramethyl-1-cyclohexyl, 3,3,4,4-tetramethyl-1-cyclohexyl, 3,3,5,5-tetramethyl-1-cyclohexyl, 1-ethyl-1-cyclopropyl, 1-ethyl-1-cyclobutyl, 1-ethyl-1-cyclopentyl, 1-ethyl-1-cyclohexyl, 1-ethyl-1-cycloheptyl, 2-ethyl-1-cyclopropyl, 2-ethyl-1-cyclobutyl, 2-ethyl-1-cyclopentyl, 2-ethyl-1-cyclohexyl, 2-ethyl-1-cycloheptyl, 3-ethyl-1-cyclobutyl, 3-ethyl-1-cyclopentyl, 3-ethyl-1-cyclohexyl, 3-ethyl-1-cycloheptyl, 4-ethyl-1-cyclohexyl or 4-ethyl-1-cycloheptyl.

According to the present invention, $R^1$ and $R^2$ can also together denote C3- to C10-alkylene, $R^1$ and $R^2$, together with the nitrogen of the urea derivative, forming a nitrogen-containing ring. In particular, it can be provided in this case that $R^1$ and $R^2$ together denote ethylene, propylene, butylene, pentylene or hexylene, it being possible for these alkylene radicals to in turn be optionally mono- or poly-substituted by alkyl radicals. $R^1$ and $^2$, together with the nitrogen of the urea derivative, thereby form an aziridine, azetidine, azolidine, azinane or azepane, which in turn can be optionally mono- or poly-substituted by C1- to C5-alkyl radicals having the meaning given above.

According to the present invention, —NHC(O)NR$^1$R$^2$ denotes a 1-ureayl radical which is substituted on the nitrogen N3 by the radicals $R^1$ and $R^2$, $R^1$ and $R^2$ having the meanings given above, and which is bonded via the nitrogen N1 to a basic structure.

According to the present invention, halogen denotes in particular fluorine, chlorine or bromine.

According to the present invention, aryl denotes in particular an aromatic aryl radical having from 3 to 20 carbon atoms, which more preferably can in turn be mono- or poly-substituted by a C1- to C5-alkyl radical having the meaning given above. Particularly preferably, it can be provided that a benzene radical, naphthalene radical, anthracene radical or perylene radical is used as the aryl radical, which in turn can be mono- or poly-substituted by a C1- to C5-alkyl radical having the meaning given above. Aryl accordingly denotes in particular toluyl, xylenyl, pseudocumolyl or mesitylenyl.

According to the present invention, arylalkyl denotes a C1- to C15-alkyl radical having the meaning given above which is substituted by an aryl radical having the meaning given above. In particular, arylalkyl can denote a benzyl radical.

Particularly preferably, liquid curing agents according to the invention comprise at least one aliphatic urea derivative according to formula (I). In these aliphatic urea derivatives according to formula (I), $R^1$ and $R^2$ simultaneously or independently of one another denote hydrogen or C1- to C15-alkyl and $R^3$ has the meaning hydrogen, C1- to C15-alkyl, C3- to C15-cycloalkyl, C1- to C15-alkyl substituted by —NHC(O)NR$^1$R$^2$, or C1- to C15-cycloalkyl substituted by —NHC(O)NR$^1$R$^2$.

Particularly preferably, the liquid curing agents according to the invention comprise at least one urea derivative of formula (I) in which at least one of the radicals $R^1$ and $R^2$ represents a methyl radical. Particular preference is given to methylurea, 1,3-dimethylurea or 1,1-dimethylurea (that is to say $R^1=R^2$=methyl and $R^3$=H).

More preferred are aliphatic urea derivatives according to formula (I) in which $R^1$ and $R^2$ have the meaning given above, in particular hydrogen, methyl or ethyl, and $R^3$ denotes C1- to C15-cycloalkyl substituted by —NHC(O)NR$^1$R$^2$. Most preferred are liquid curing agents comprising aliphatic urea derivatives according to formula (IV)

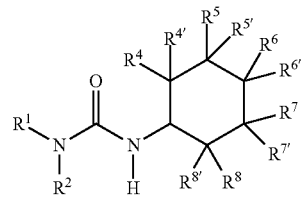

Formula (IV)

the following applying to the radicals, simultaneously or independently of one another:
$R^1$, $R^2$=simultaneously or independently of one another hydrogen, C1- to C15-alkyl, C3- to C15-cycloalkyl or together, with formation of a ring, C3- to C10-alkylene;
$R^4$, $R^{4'}$, $R^5$, $R^{5'}$, $R^6$, $R^{6'}$, $R^7$, $R^{7'}$, $R^8$, $R^{8'}$=simultaneously or independently of one another hydrogen, C1- to C15-alkyl, C3- to C15-cycloalkyl, —NHC(O)NR$^1$R$^2$, or C1- to C15-alkyl substituted by —NHC(O)NR$^1$R$^2$.

More preferred are liquid curing agents comprising aliphatic urea derivatives of formula (IV) in which $R^1$ and $R^2$ simultaneously or independently of one another denote hydrogen or methyl and $R^4$, $R^{4'}$, $R^5$, $R^{5'}$, $R^6$, $R^{6'}$, $R^7$, $R^{7'}$, $R^8$, $R^{8'}$ simultaneously or independently of one another denote hydrogen, methyl, ethyl, —NHC(O)NR$^1$R$^2$, or methyl or ethyl substituted by —NHC(O)NR$^1$R$^2$. Particular preference is given to 1-(N,N-dimethylurea)-3-(N,N-dimethylureamethyl)-3,5,5-trimethylcyclohexane, hereinafter also N'-[3-[[[(dimethylamino)-carbonyl]amino]methyl]-3,5,5-trimethylcyclohexyl]-N,N-dimethylurea (that is to say $R^1=R^2=R^5=R^{5'}=R^7$=methyl, and $R^{7'}$=–CH$_2$—NHC(O)N(CH$_3$)$_2$, and $R^4=R^{4'}=R^6=R^{6'}=R^8=R^{8'}$=hydrogen).

In an alternative embodiment, however, it can also be provided that a liquid curing agent according to the invention comprises an aromatic urea derivative. Accordingly, this liquid curing agent comprises at least one urea derivative of formula (I) in which the radical $R^3$=aryl, arylalkyl, aryl substituted by —NHC(O)NR$^1$R$^2$, or arylalkyl substituted by —NHC(O)NR$^1$R$^2$ represents a radical of the general formula (V),

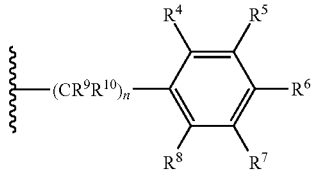

(Formula V)

the radicals $R^1$, $R^2$ having the meaning given above and the following applying to the further radicals, simultaneously or independently of one another:
$R^4$, $R^5$, $R^6$, $R^7$, $R^8$=hydrogen, halogen, C1- to C15-alkyl, C3- to C15-cycloalkyl, aryl, arylalkyl, —CF$_3$, —NHC(O)NR$^1$R$^2$, C1- to C15-alkyl substituted by —NHC(O)NR$^1$R$^2$, aryl substituted by —NHC(O)NR$^1$R$^2$, or arylalkyl substituted by —NHC(O)NR$^1$R$^2$;
$R^9$, $R^{10}$=simultaneously or independently of one another hydrogen or C1- to C15-alkyl;
n=a number between 0 and 10.

Of these aromatic urea derivatives, particular preference is given to those urea derivatives in which the radicals $R^4$, $R^5$, $R^6$, $R^7$ and $R^8$ simultaneously or independently of one another denote hydrogen, C1- to C15-alkyl, —NHC(O)NR$^1$R$^2$, C1- to C15-aryl substituted by —NHC(O)NR$^1$R$^2$, or C1- to C15-arylalkyl substituted by —NHC(O)NR$^1$R$^2$. More preferred are liquid curing agents comprising urea derivatives of formula (VI),

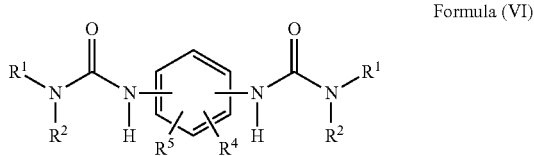

Formula (VI)

in which $R^1$, $R^2$, $R^4$ and $R^5$ have the meanings given above and in particular, simultaneously or independently of one another, represent hydrogen, C1- to C15-alkyl. Preferably, the radicals $R^1$ and $R^2$ in connection with formula (VI) denote a methyl radical. Particular preference is given to 1,1'-(4-methyl-m-phenylene)-bis-(3,3-dimethylurea) and 1,1'42-methyl-m-phenylene)-bis-(3,3-dimethylurea) (that is to say $R^1=R^2=R^5$ methyl, and $R^4$ hydrogen).

According to a further embodiment, it can be provided in particular that the liquid curing agents according to the invention comprise, in particular contain, a) cyanamide, b) two different urea derivatives of formula (I), (IV) and/or (VI), and c) at least one curing accelerator from the class of the imidazolines according to formula (II) or of the imidazoles according to formula (III), wherein these curing agents further preferably comprise, in particular contain, cyanamide and two different urea derivatives of formula (I), (IV) and/or (VI) in a molar ratio cyanamide:urea derivative or urea derivative mixture of from 1:1 to 4:1.

According to a further embodiment of the invention, the invention relates to such liquid curing agents which comprise, in particular contain, a) cyanamide, b) at least one urea derivative selected from the group urea, 1-methylurea, 1,1-dimethylurea, 1,3-dimethylurea, 3-(3-chloro-4-methylphenyl)-1,1-dimethylurea, 3-(p-chlorophenyl)-1,1-dimethylurea, 3-phenyl-1,1-dimethylurea, 3-(3,4-dichlorophenyl)-1,1-dimethylurea, 1,1'-(methylenedi-p-phenylene)-bis-(3,3-dimethylurea), 3-(3-trifluoromethylphenyl)-1,1-dimethylurea, 1,1'-(2-methyl-m-phenylene)-bis-(3,3-dimethylurea) and/or 1,1'-(4-methyl-m-phenylene)-bis-(3,3-dimethylurea), and c) at least one curing accelerator from the class of the imidazolines according to formula (II) or of the imidazoles according to formula (III), wherein cyanamide and the urea derivative or urea derivative mixture are further preferably used in a molar ratio of from 1:1 to 4:1.

Essentially to the invention, liquid curing agents according to the present invention comprise curing accelerators from the class of the imidazolines according to formula (II) or of the imidazoles according to formula (III). These imidazolines and imidazoles, in combination with liquid basic mixtures of cyanamide and at least one urea derivative of the type described herein, exhibit a very good action as curing accelerators, whereby the liquid properties are not substantially changed and liquid curing agents are still present. In addition, it has been shown, particularly surprisingly, that the latency of the liquid curing agents can be improved as compared with the basic mixtures and the storability can thus be increased. Overall, therefore, a curing agent can be provided which, on account of its high latency in the polymer resin compositions and its high reactivity in the polymer resin compositions at the curing temperature, is outstandingly suitable for use in infusion or injection processes.

In a development, liquid curing agents can particularly preferably comprise a curing accelerator from the class of the imidazolines according to formula (II) or of the imidazoles according to formula (III), wherein the following apply to the radicals, simultaneously or independently of one another:
$R^{30}$=hydrogen, methyl, ethyl, propyl, butyl, pentyl, hexyl, heptyl, octyl, nonyl, decanyl or phenyl;
$R^{32}$, $R^{34}$=simultaneously or independently of one another hydrogen, C1- to C5-alkyl or phenyl;
$R^{33}$, $R^{35}$=simultaneously or independently of one another hydrogen, C1- to C5-alkyl or phenyl.

Most preferably, according to the present invention imidazolines according to formula (II) or imidazoles according to formula (III) selected from the group 2-methyl-1H-imidazole, 2-ethyl-1H-imidazole, 2-propyl-1H-imidazole, 2-butyl-1H-imidazole, 2-pentyl-1H-imidazole, 2-hexyl-1H-imidazole, 2-heptyl-1H-imidazole, 2-octyl-1H-imidazole, 2-nonyl-1H-imidazole, 2-decyl-1H-imidazole, 2-phenyl-1H-imidazole, 2-methyl-1H-imidazoline, 2-ethyl-1H-imidazoline, 2-propyl-1H-imidazoline, 2-butyl-1H-imidazoline, 2-pentyl-1H-imidazoline, 2-hexyl-1H-imidazoline, 2-heptyl-1H-imidazoline, 2-octyl-1H-imidazoline, 2-nonyl-1H-imidazoline, 2-decyl-1H-imidazoline and/or 2-phenyl-1H-imidazoline can be used as curing accelerators. Surprisingly, the imidazoles further improve the latency as compared with 1-alkylimidazoles and thus increase the storage stability of the liquid curing agents.

In addition, tests have shown that better processing of a polymer resin composition, in particular an epoxy resin composition, comprising a liquid curing agent of the type described here in infusion or injection processes but also in prepreg processes can be provided if a viscosity modifier is further added to the liquid curing agents. There can accordingly be used, for example, for the production of prepregs a viscosity modifier which effects an increase in the viscosity of the resulting resin composition. Particularly good adhesion of the resulting resin composition to the carrier materials is thereby achieved. On the other hand, the viscosity of the resin composition that is to be produced can be lowered by adding suitable viscosity modifiers, by adding to the liquid curing agent according to the invention an appropriate viscosity modifier. Such liquid curing agents having viscosity-lowering properties can be used particularly well in infusion or injection processes. Such viscosity modifiers can be added to the liquid curing agents according to the invention without their liquid state being substantially affected. It was particularly surprising that these modifiers in many cases do not adversely affect the latency of the resin compositions having the added liquid curing agents. Instead, it has also been shown that the latency could be increased and the storability of the resulting resin compositions could accordingly be improved.

According to a further advantageous embodiment, the present invention accordingly also includes a liquid curing agent which, as well as comprising a) cyanamide, b) at least one urea derivative of formula (I), (IV) and/or (VI), c) at least one curing accelerator from the class of the imidazolines according to formula (II) or of the imidazoles according to formula (III), further comprises d) at least one viscosity modifier selected from the group of the monools, diols and polyols, ethers, polyethers and polyether polyols, ketones, aldehydes, nitriles, carboxylic acid esters or mixtures thereof. Particular preference is given to liquid curing agents which comprise a viscosity modifier from the mentioned group which in turn has a boiling point of at least 100° C. Upon curing, such modifiers remain in the mouldings that are to be produced and are preferably incorporated into the polymer matrix or additionally crosslink this polymer matrix.

Viscosity modifiers from the group of the monools, diols and polyols, ethers, ether alcohols, polyethers, polyether polyols or mixtures thereof, in particular those which in turn have a boiling point of at least 100° C., have been shown to be particularly effective viscosity modifiers.

In a particularly preferred embodiment, a liquid curing agent comprises at least one viscosity modifier selected from the group of the monools, diols and polyols, ethers, polyethers, ether alcohols and polyether polyols or mixtures thereof according to the general formula (VII),

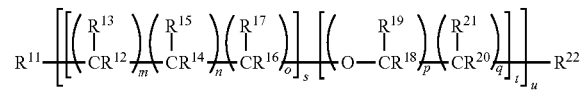

Formula (VII)

the following applying to the radicals, simultaneously or independently of one another:

$R^{11}$, $R^{22}$=simultaneously or independently of one another hydrogen, —OH or C1- to C15-alkyl;

$R^{12}$, $R^{14}$, $R^{16}$, $R^{18}$, $R^{29}$=simultaneously or independently of one another hydrogen, —OH or C1- to C5-alkyl;

$R^{13}$, $R^{15}$, $R^{17}$, $R^{19}$, $R^{21}$=simultaneously or independently of one another hydrogen, —OH, —NH$_2$ or C1- to C5-alkyl;

with m, n, o, s, p, q, t=simultaneously or independently of one another a number from 0 to 10, in particular from 0 to 5; and in which i) m, s, u=simultaneously or independently of one another a number from 1 to 10, in particular from 1 to 5; and/or ii) p, t, u=simultaneously or independently of one another a number from 1 to 10, in particular from 1 to 5.

More preferably, monoalcohols are used from the group of the C2- to C10-amino alcohols and the C6- to C12-alcohols, in particular 1-hexanol, 1-heptanol, 1-octanol, 1-nonanol, 1-decanol, 2-hexanol, 2-heptanol, 2-octanol, 2-nonanol, 2-decanol, 2-aminoethanol, 3-aminopropanol, 4-aminobutanol, 5-aminopentanol, 6-aminohexanol, 7-aminoheptanol, 8-aminooctanol, 9-aminononanol, 10-aminodecanol or mixtures thereof, the dialcohols from the group of the C2- to C12-alcohols, in particular ethylene glycol, propylene glycol, butylene glycol, pentylene glycol, hexylene glycol or mixtures thereof, the trialcohols from the group of the C3- to C12-alcohols, in particular 1,2,3-propanetriol, 1,2,3-butanetriol, 1,2,3-pentanetriol, 1,2,3-hexanetriol, 1,2,4-hexanetriol, 1,2,6-hexanetriol or mixtures thereof, the aldehydes from the group of the C6- to C12-aldehydes, in particular hexanal, heptanal, octanal, nonanal, decanal or mixtures thereof, the ketones, in particular 2-pentanone, 3-pentanone, 2-hexanone, 3-hexanone, 2-heptanone, 3-heptanone, 2-octanone, 3-octanone or mixtures thereof, the ethers, nitriles, polyethers, ether alcohols or polyether polyols from the group dibutyl ether, dipentyl ether, dihexyl ether, diheptyl ether, dioctyl ether, dinonyl ether, didecanyl ether, methoxy and ethoxy alcohols, methoxy and ethoxy dialcohols, polyethylene glycols, polypropylene glycols, polyethylene propylene glycols, polyethylene glycol monoalkyl ethers, in particular polyethylene glycol monomethyl ether, polyethylene glycol monoethyl ether, ethyl hexyl ether, ethyl heptyl ether, ethyl octyl ether, ethyl nonyl ether, ethyl decanyl ether, benzonitrile, acetonitrile or mixtures thereof.

According to a further advantageous embodiment, the present invention accordingly also relates to a liquid curing agent for curing curable polymer resins which comprises, in particular contains, a) cyanamide, b) at least one urea derivative of formula (I), (IV) and/or (VI), c) at least one curing accelerator from the class of the imidazolines according to formula (II) or of the imidazoles according to formula (III), and d) a viscosity modifier, in particular a viscosity modifier according to formula (VII), wherein the liquid curing agent preferably comprises cyanamide and at least one urea derivative of formula (I), (IV) or (VI) in a molar ratio cyanamide: urea derivative or urea derivative mixture of from 1:1 to 4:1.

In the presence of at least one viscosity modifier, the molar ratios of cyanamide:urea derivative can also be outside the preferred range of from 1:1 to 4:1. For example, molar ratios of cyanamide:urea derivative of 0.1 to <1:1, in particular 0.2 to <1:1 are possible, as are molar ratios of cyanamide:urea derivative of from >4:1 to 20:1, in particular from >4:1 to 10:1.

Also surprisingly, it has been found that a particularly high latency, and thus high storage stability, of the curing agents themselves as well as of epoxy resin compositions comprising these curing agents can be established if a stabiliser from the group of the inorganic or organic acids is further added to the curing agents. By adding stabilisers from the group of the inorganic or organic acids it was possible to double, in some cases even triple, the latency. At the same time, the outstanding curing properties, such as, for example, the high reactivity at the curing temperature, are retained in comparison with the curing agents without stabilisers.

According to a further embodiment, the present invention accordingly also includes a liquid curing agent which preferably further comprises e) a stabiliser selected from the group of inorganic or organic acids.

Organic acids from the group of the aromatic and non-aromatic carboxylic acids, dicarboxylic acids or tricarboxylic acids in particular have been shown to be particularly suitable as stabilisers. More preferably, in particular acids from the group formic acid, acetic acid, propanoic acid, maleic acid, malonic acid, salicylic acid, lactic acid, citric acid, oxalic acid, adipic acid, benzoic acid, phthalic acid, alkylsulfonic acids, arylsulfonic acids, in particular toluenesulfonic acid, or their anhydrides can be used as organic acids or as aromatic and non-aromatic carboxylic acids, dicarboxylic acids or tricarboxylic acids.

It can, however, also be provided that curing agents according to the invention comprise as a stabiliser inorganic acids selected from the group hydrochloric acid, sulfuric acid, sulfurous acid, phosphoric acid, phosphorous acid, ortho-phosphoric acid, diphosphoric acid, triphosphoric acid, polyphosphoric acid, nitric acid or their anhydrides.

Accordingly, the present invention also relates to a liquid curing agent which comprises as a stabiliser an inorganic or organic acid from the group salicylic acid, phthalic acid, toluenesulfonic acid, sulfuric acid, phosphoric acid or their anhydrides or mixtures thereof.

According to a further advantageous embodiment, the present invention accordingly also relates to a liquid curing agent for curing curable polymer resins which comprises, in particular contains, a) cyanamide, b) at least one urea derivative of formula (I), c) at least one curing accelerator from the class of the imidazolines according to formula (II) or of the imidazoles according to formula (III), d) optionally a viscosity modifier, and e) at least one stabiliser selected from the group of the organic acids, in particular aromatic and non-aromatic carboxylic acids, dicarboxylic acids or tricarboxylic acids, or of the inorganic acids, in particular inorganic acids selected from the group hydrochloric acid, sulfuric acid, sulfurous acid, phosphoric acid, phosphorous acid, ortho-phosphoric acid, diphosphoric acid, triphosphoric acid, polyphosphoric acid, nitric acid or their anhydrides, wherein the liquid curing agent in particular comprises cyanamide and at least one urea derivative of formula (I) in a molar ratio cyanamide: urea derivative or urea derivative mixture of from 1:1 to 4:1.

In the presence of at least one stabiliser, the molar ratios of cyanamide:urea derivative can also be outside the preferred range of from 1:1 to 4:1. For example, molar ratios of cyanamide:urea derivative of 0.1 to <1:1, in particular 0.2 to <1:1 are possible, as are molar ratios of cyanamide:urea derivative of from >4:1 to 20:1, in particular from >4:1 to 10:1.

Particular preference is given to those acids, in particular inorganic acids, which have a water content of less than 20 wt. % (based on the acid). Most preference is given to those acids, in particular inorganic acids, which have a water content of less than 15 wt. %, more preferably less than 10 wt. % and most particularly less than 5 wt. % (in each case based on the acid). Liquid curing agents which are themselves liquid and are solvent-free within the meaning of the present invention can accordingly be provided.

According to a particularly preferred embodiment of the present invention, a liquid curing agent comprises
 a) from 1 to 50 parts by weight of cyanamide,
 b) from 1 to 50 parts by weight of at least one urea derivative of formula (I), (IV) and/or (VI),
 c) from 0.01 to 50 parts by weight of at least one curing accelerator from the class of the imidazolines of formula (II) and/or of the imidazoles of formula (III),
 d) from 0 to 10 parts by weight of at least one viscosity modifier,
 e) from 0 to 10 parts by weight of at least one stabiliser In a development of the present invention, the present invention likewise relates to epoxy resin compositions comprising a) at least one curable epoxy resin and b) at least one liquid curing agent of the type described above, as well as polyurethane resin compositions comprising a) at least one curable polyurethane resin and b) at least one liquid curing agent of the type described above.

The present invention is not subject to any limitations as regards the epoxy resins to be cured. All commercial products which conventionally contain more than one 1,2-epoxy group (oxirane) and can thereby be saturated or unsaturated, aliphatic, cycloaliphatic, aromatic or heterocyclic are suitable. The epoxy resins can additionally contain substituents such as halogens, phosphorus and hydroxyl groups. Epoxy resins based on glycidyl polyether of 2,2-bis(4-hydroxyphenyl)-propane (bisphenol A) and the bromine-substituted derivative (tetrabromobisphenol A), glycidyl polyether of 2,2-bis(4-hydroxyphenyl)methane (bisphenol F) and glycidyl polyether of novolaks and based on aniline or substituted anilines such as p-aminophenol or 4,4'-diaminodiphenylmethanes can be cured particularly well using the curing agents according to the invention.

There are no limitations as regards the amount of the liquid curing agents according to the invention that is to be used. Preference is given, however, to the use of from 0.01 to 15 parts, preferably from 0.1 to 15 parts, preferably from 0.1 to 10 parts and most preferably from 1 to 10 parts (in each case based on the weight), per 100 parts of resin, in particular curable epoxy resin or curable polyurethane resin. A combination of a plurality of liquid curing agents according to the invention or a combination of liquid curing agents according to the invention with further co-curing agents is also covered by this invention.

Curing of the epoxy resins with the aid of the curing agents used according to the invention generally takes place at temperatures above 80° C. The choice of curing temperature is dependent on the specific processing and product requirement and can be varied via the formulation especially by regulating the amounts of curing agent and by adding further additives. The manner in which energy is supplied to the resin formulations is unimportant. For example, it can be effected in the form of heat by means of an oven or heating elements, but likewise by means of infra-red radiators or excitation by microwaves or other radiation.

By adding further commercial additives such as are known to a person skilled in the art for the curing of epoxy resins, the curing profile of the formulations according to the invention can be varied.

Additives for improving the processability of the uncured epoxy resin compositions or of the uncured polyurethane compositions or additives for adapting the thermo-mechanical properties of the duroplastic products produced therefrom to the requirements profile include, for example, reactive diluents, fillers, rheology additives such as thixotropic agents or dispersing additives, defoamers, dyes, pigments, impact modifiers, toughening agents or fire retardant additives.

Epoxy resin formulations comprising the curing agents according to the invention are suitable for both manual and machine processing processes and in particular for the production of impregnated reinforcing fibres and composites, as are described inter alia in the papers of G.W. Ehrenstein, Faserverbund-Kunststoffe, 2006, 2nd Edition, Carl Hanser Verlag, Munich, Chapter 5, page 148ff, and M. Reyne, Composite Solutions, 2006, JEC Publications, Chapter 5, page 51ff. Apart from their use in the prepreg process, handling in infusion and injection processes in particular is a preferred form of processing. The generally very good miscibilities of the liquid curing agents according to the invention into the epoxy resins are advantageous here because flowable infusion resins with low viscosity are necessary for the impregnating process (see inter alia M. Reyne, Composite Solutions, 2006, JEC Publications, Chapter 5, page 65; and G.W. Ehrenstein, Faserverbund-Kunststoffe, 2006, 2nd Edition, Carl Hanser Verlag, Munich, Chapter 5, page 166).

Accordingly, the invention also relates to a composite material comprising a) a carrier material, in particular a fibre material, b) at least one curable epoxy resin and/or curable polyurethane resin, and c) at least one liquid curing agent of the type described above.

Accordingly, the present invention also relates to the use of liquid curing agents of the type described above for curing curable compositions. In particular, this use is directed to compositions that comprise at least one curable epoxy resin and/or one curable polyurethane resin.

Furthermore, the present invention also includes the use of liquid curing agents of the type described above for curing impregnated fibre materials or impregnated woven fabrics, knitted fabrics or meshes.

Because of the advantageous use properties of the liquid curing agents according to the invention and their low use amounts, an advantageous cost-benefit ratio is achieved, whereby the curing agents are particularly suitable for industrial use.

EXAMPLES

1) Raw Materials Used

Cyanamide: AlzChem AG
Urea B1: 1,1-dimethylurea—(AlzChem AG)
Urea B2: 1,1'-(4-methyl-m-phenylene)-bis-(3,3-dimethylurea)—(AlzChem AG)
Urea B4: N'-[3-[[[(dimethylamino)carbonyl]amino]methyl]-3,5,5-trimethylcyclohexyl]-N,N-dimethylurea—(AlzChem AG)
E 828 LVEL: epoxy resin Epikote 828 LVEL—(Momentive)
RIMR 135: epoxy resin—(Momentive Specialty Chemicals)
RIMH 137: liquid amine curing agent—(Momentive Specialty Chemicals)
Vestamin IPDA: liquid amine curing agent—(Evonik Degussa GmbH)
Modifier M1: 1-hexanol (b.p. 157° C.)—(Merck)
Modifier M2: ethylene glycol (b.p. 197° C.)—(Merck)
Modifier M3: hexanetriol (b.p. 178° C.)—(Evonik Degussa GmbH)
Modifier M4: 3-pentanone (b.p. 102° C.)—(Baker)
Modifier M5: octanal (b.p. 171° C.)—(Merck)
Modifier M6: benzonitrile (b.p. 191° C.)—(AlzChem AG, Trostberg)
Modifier M7: acetic acid ethyl ester (b.p. 180° C.)—(Fluka)
Modifier M8: methyl glycol (b.p. 124° C.)—(Roth)
Modifier M9: 2-aminoethanol (b.p. 172° C.)—(Roth)
Modifier M10: acetic anhydride (b.p. 139° C.)—(Merck)
Accelerator I1: 2-methyl-1H-imidazole—(AlzChem AG)
Accelerator I2: 1-methylimidazole—(Roth)
Accelerator I3: 2-phenyl-1H-imidazole—(AlzChem AG)
Accelerator I4: 2-phenyl-1H-imidazoline—(AlzChem AG)
Accelerator I5: 4,5-dihydro-2-nonyl-1H-imidazole—(AlzChem AG)
Accelerator I6: 2-nonyl-1H-imidazole—(AlzChem AG)

TABLE 1

Compositions of the liquid curing agents with curing accelerator

| No. | Starting mixture for liquid curing agents | | | | Molar ratios starting mixture:curing accelerator [mol:mol] | | | | | | | Liquid curing agent No. |
|---|---|---|---|---|---|---|---|---|---|---|---|---|
| | Cyanamide | B1 | B2 | B4 | Starting mixture | I1 | I2 | I3 | I4 | I5 | I6 | |
| H5 | X | X | X | — | 1 | 0 | 0 | 0 | 0 | 0 | 0 | H5* |
| H6 | X | — | — | X | 1 | 0 | 0 | 0 | 0 | 0 | 0 | H6* |
| H6 | X | — | — | X | 1 | 0.021 | 0 | 0 | 0 | 0 | 0 | H6I1 |
| H6 | X | — | — | X | 1 | 0 | 0.010 | 0 | 0 | 0 | 0 | H6I2 |
| H6 | X | — | — | X | 1 | 0 | 0 | 0.008 | 0 | 0 | 0 | H6I3 |
| H6 | X | — | — | X | 1 | 0 | 0 | 0 | 0.008 | 0 | 0 | H6I4 |
| H6 | X | — | — | X | 1 | 0 | 0 | 0 | 0 | 0.009 | 0 | H6I5 |
| H6 | X | — | — | X | 1 | 0 | 0 | 0 | 0 | 0 | 0.009 | H6I6 |
| H7 | X | X | X | X | 1 | 0 | 0 | 0 | 0 | 0 | 0 | H7* |
| H7 | X | X | X | X | 1 | 0.016 | 0 | 0 | 0 | 0 | 0 | H7I1 |

*not according to the invention

TABLE 2

Composition of the liquid curing agents with viscosity modifiers

| Starting mixture according to Table 1 No. | Molar ratios starting mixture:curing accelerator/[mol:mol] | | | | | | | | | | | Liquid curing agent No. |
|---|---|---|---|---|---|---|---|---|---|---|---|---|
| | Starting mixture | M1 | M2 | M3 | M4 | M5 | M6 | M7 | M8 | M9 | M10 | |
| H5 | 1 | 0.304 | 0 | 0 | 0 | 0 | 0 | 0 | 0 | 0 | 0 | H5M1 |
| H5 | 1 | 0 | 0.502 | 0 | 0 | 0 | 0 | 0 | 0 | 0 | 0 | H5M2 |
| H5 | 1 | 0 | 0 | 0.232 | 0 | 0 | 0 | 0 | 0 | 0 | 0 | H5M3 |
| H5 | 1 | 0 | 0 | 0 | 0.362 | 0 | 0 | 0 | 0 | 0 | 0 | H5M4 |
| H5 | 1 | 0 | 0 | 0 | 0 | 0.248 | 0 | 0 | 0 | 0 | 0 | H5M5 |
| H5 | 1 | 0 | 0 | 0 | 0 | 0 | 0.302 | 0 | 0 | 0 | 0 | H5M6 |
| H5 | 1 | 0 | 0 | 0 | 0 | 0 | 0 | 0.239 | 0 | 0 | 0 | H5M7 |
| H5 | 1 | 0 | 0 | 0 | 0 | 0 | 0 | 0 | 0.409 | 0 | 0 | H5M8 |
| H5 | 1 | 0 | 0 | 0 | 0 | 0 | 0 | 0 | 0 | 0.510 | 0 | H5M9 |
| H5 | 1 | 0 | 0 | 0 | 0 | 0 | 0 | 0 | 0 | 0 | 0.305 | H5M10 |
| H6 | 1 | 0.362 | 0 | 0 | 0 | 0 | 0 | 0 | 0 | 0 | 0 | H6M1 |
| H6 | 1 | 0 | 0.597 | 0 | 0 | 0 | 0 | 0 | 0 | 0 | 0 | H6M2 |
| H6 | 1 | 0 | 0 | 0.276 | 0 | 0 | 0 | 0 | 0 | 0 | 0 | H6M3 |
| H6 | 1 | 0 | 0 | 0 | 0.430 | 0 | 0 | 0 | 0 | 0 | 0 | H6M4 |
| H6 | 1 | 0 | 0 | 0 | 0 | 0.289 | 0 | 0 | 0 | 0 | 0 | H6M5 |
| H6 | 1 | 0 | 0 | 0 | 0 | 0 | 0.359 | 0 | 0 | 0 | 0 | H6M6 |
| H6 | 1 | 0 | 0 | 0 | 0 | 0 | 0 | 0.284 | 0 | 0 | 0 | H6M7 |
| H6 | 1 | 0 | 0 | 0 | 0 | 0 | 0 | 0 | 0.487 | 0 | 0 | H6M8 |
| H6 | 1 | 0 | 0 | 0 | 0 | 0 | 0 | 0 | 0 | 0.607 | 0 | H6M9 |
| H6 | 1 | 0 | 0 | 0 | 0 | 0 | 0 | 0 | 0 | 0 | 0.363 | H6M10 |

TABLE 3

Composition of liquid curing agents according to the invention with viscosity modifiers and curing accelerators-molar ratios/[mol:mol]

| Starting mixture according to Table 1 | Starting mixture | M3 | Liquid curing agent |
|---|---|---|---|
| H6I1 | 1 | 0.276 | H6I1M3 |
| H6I2 | 1 | 0.276 | H6I2M3 |
| H6I3 | 1 | 0.276 | H6I3M3 |
| H6I4 | 1 | 0.276 | H6I4M3 |
| H6I5 | 1 | 0.276 | H6I5M3 |
| H6I6 | 1 | 0.276 | H6I6M3 |
| H7I1 | 1 | 0.276 | H7I1M3 |

2) Production of Liquid Curing Agents
a) With Viscosity Modifiers and Curing Accelerators
Apparatus: 500 ml double-walled reaction vessel, thermostat, KPG stirrer, 3-blade metal stirrer, thermometer, powder funnel
Procedure: Cyanamide, the variousureas (B1, B2, B4), the viscosity modifier (M3) and the curing accelerators (I1-I6) are first introduced into the reaction vessel by means of the powder funnel. The double-walled reaction vessel is then charged with warm water at 40 to 42° C., and the 3-blade metal stirrer (200 rpm) is switched on. According to the viscosity modifier, a liquid curing agent is then produced at an internal temperature of 35 to 40 C in 20 to 40 minutes. The liquid curing agent is then cooled to 20 to 25° C., transferred into glass containers and stored at 23° C.
b) With Viscosity Modifiers
Apparatus: 500 ml double-walled reaction vessel, thermostat, KPG stirrer, 3-blade metal stirrer, thermometer, powder funnel
Procedure: Cyanamide, the various ureas (B1, B2, B4) and the viscosity modifier (M1-M10) are first introduced into the reaction vessel by means of the powder funnel. The double-walled reaction vessel is then charged with warm water at 40 to 42° C., and the 3-blade metal stirrer is switched on (200 rpm). According to the viscosity modifier, a liquid curing agent is then produced at an internal temperature of from 35 to 40° C. in 20 to 40 minutes. The liquid curing agent is then cooled to 20 to 25° C., transferred into glass containers and stored at 23° C.

3) Use Tests—Results: Properties of Epoxy Resin Compositions According to the Invention
a) Composition of Epoxy Resin Compositions According to the Invention
For the use tests, epoxy resin compositions with liquid curing agents according to the invention were used in the same mixing ratios (in each case 100 parts by weight of epoxy resin, 10 parts by weight of liquid curing agent).
b) Production of Epoxy Resin Compositions According to the Invention
100 parts by weight of epoxy resin (Epikote 828 LVEL) and 10 parts by weight of the curing agents according to the invention according to Tables 1-3 are weighed into a 250 ml dispersing vessel and mixed for 2 minutes in a dissolver at 500 rpm. The mixture is then deaerated in vacuo for 10 minutes.
c) Measuring Methods for Determining the Properties
Dyn-DSC: Measurement on Mettler Toledo DSC 822
  Standard 30-250° C., with a heating rate of 10 K/min
Glass transition temperature: Measurement on Mettler Toledo DSC 822
  heat to $T_g$ 3×
  heat from 30° C. to 200° C. at 20 K/min
  maintain at 200° C. for 10.0 min
  cool from 200° C. to 50° C. at 20 K/min
  maintain at 50° C. for 5.0 min
  heat from 50° C. to 200° C. at 20 K/min
  maintain at 200° C. for 10.0 min
  cool from 200° C. to 50° C. at 20 K/min
  maintain at 50° C. for 5.0 min
  heat from 50° C. to 220° C. at 20 K/min
Viscosity: Measurement conducted on HAAKE Rheostress 1 at 25° C. in Pa*s, with rotor cone 1° C.35/1 Ti Ø35 mm with a shear rate of 5.0 1/s (reciprocal seconds)
Gel time: Measurement on metal block thermostat VLM 2.0/-HAT in ALU-Steck caps (Ø15 mm×25 mm height) at 140° C.
Latency: Storability of the epoxy resin compositions in days (d) after storage at 23° C. in a climate cabinet.
  Definition of latency: The time in days (d) after which the viscosity of the epoxy resin composition has doubled. At this point in time, the end of storability has been reached.

TABLE 4

Epoxy resin compositions liquid curing agents, and their properties

| Epoxy resin composition | Liquid curing agent | Dyn-DSC onset [° C.] | Dyn-DSC peak [° C.] | Integral heat [J/g] | Gel time at 140° C. [min:sec] | Glass transition temp. $T_g$ [° C.] | Viscosity at 25° C. [Pa * s] | Latency at 23° C. [d] |
|---|---|---|---|---|---|---|---|---|
| E1* | H5* | 132 | 144 | 342 | 03:30 | 111 | 5.5 | 6 |
| E2 | H5M1 | 137 | 146 | 271 | 02:20 | 113 | 2.3 | 3 |
| E3 | H5M2 | 133 | 144 | 281 | 02:55 | 111 | 3.3 | 3 |
| E4 | H5M3 | 139 | 148 | 254 | 05:20 | 113 | 6.2 | 21 |
| E5 | H5M4 | 143 | 152 | 219 | 04:20 | 121 | 2.2 | 20 |
| E6 | H5M5 | 129 | 142 | 198 | 01:20 | 110 | 4.7 | 3 |
| E7 | H5M6 | 142 | 152 | 191 | 02:30 | 116 | 2.6 | 3 |
| E8 | H5M7 | — | — | — | — | — | — | — |
| E9 | H5M8 | 143 | 153 | 253 | 08:15 | 121 | 2.1 | 20 |
| E10 | H5M9 | — | — | — | — | — | — | — |
| E11 | H5M10 | — | — | — | — | — | — | — |
| E12* | H6* | 134 | 144 | 252 | 12:00 | 113 | 6.1 | 6 |
| E13 | H6M1 | 135 | 145 | 247 | 10:45 | 127 | 3.6 | 6 |
| E14 | H6M2 | 142 | 151 | 195 | 08:30 | 125 | 4.7 | 22 |
| E15 | H6M3 | 139 | 148 | 262 | 06:30 | 121 | 7.4 | 27 |
| E16 | H6M4 | 147 | 152 | 281 | 15:30 | 121 | 3.6 | 19 |
| E17 | H6M5 | 128 | 141 | 175 | 14:30 | 119 | 5.8 | 5 |
| E18 | H6M6 | 147 | 160 | 238 | 15:00 | 121 | 3.2 | 25 |
| E19 | H6M7 | 141 | 151 | 214 | 16:30 | 121 | 2.9 | 4 |

TABLE 4-continued

Epoxy resin compositions liquid curing agents, and their properties

| Epoxy resin composition | Liquid curing agent | Dyn-DSC onset [° C.] | Dyn-DSC peak [° C.] | Integral heat [J/g] | Gel time at 140° C. [min:sec] | Glass transition temp. $T_g$ [° C.] | Viscosity at 25° C. [Pa * s] | Latency at 23° C. [d] |
|---|---|---|---|---|---|---|---|---|
| E20 | H6M8 | 143 | 153 | 253 | 08:15 | 121 | 2.1 | 11 |
| E21 | H6M9 | 111 | 152 | 246 | 03:30 | 123 | 9.3 | <1 h |
| E22 | H6M10 | 95 | 131 | 450 | 40:00 | 126 | 2.7 | 8 |
| E23 | H6I1M3 | 135 | 144 | 315 | 04:00 | 120 | 9.7 | 10 |
| E24 | H6I2M3 | 127 | 142 | 147 | 04:30 | 121 | 8.0 | 2 |
| E25 | H6I3M3 | 143 | 151 | 275 | 05:20 | 121 | 7.5 | 25 |
| E26 | H6I4M3 | 141 | 149 | 275 | 05:00 | 120 | 8.2 | 34 |
| E27 | H6I5M3 | 144 | 150 | 265 | 05:45 | 118 | 8.0 | 34 |
| E28 | H6I6M3 | 142 | 149 | 267 | 06:00 | 119 | 7.3 | 19 |
| E29* | H7* | 127 | 133 | 232 | 06:15 | 128 | 5.4 | 1 |
| E30 | H7M3I1 | 131 | 142 | 356 | 03:00 | 115 | 7.4 | 6 |
| E31** | VESTAMIN IPDA* | 80 | 116 | 453 | 13:30 at 80° C. | 99 | 5.3 | <1 |
| E32*** | RIMH137* | 88 | 126 | 436 | 40:00 at 80° C. | 98 | 4.1 | <1 |

*not according to the invention
**not according to the invention, epoxy resin used E828 - (Momentiv Specialty Chemicals), 100 parts epoxy resin: 23 parts Vestamin IPDA - (Evonik Degussa GmbH)
***not according to the invention, epoxy resin used RIMR 135 - (Momentiv Specialty Chemicals), 100 parts epoxy resin: 30 parts RIMH 137 (Momentiv Specialty Chemicals).

The results given in Table 4 of the reactions of the various viscosity-modified liquid curing agents with epoxy resin clearly show that the viscosity modifiers scarcely exert an effect on the glass transition temperature ($T_g$) of the resulting polymer. However, their effect on the viscosities, as intended, the latencies and the gel times is considerable. The different classes of viscosity modifiers can exert different effects on the viscosity-modified liquid curing agents according to the invention.

While monohydric alcohols, dihydric alcohols, ketones, nitriles and ethers have a viscosity-reducing effect in the case of curing agents H5 and H6, trihydric alcohols increase the viscosity. Aldehydes have a neutral effect on the viscosity. In the case of curing agents H6, esters and anhydrides also have a viscosity-reducing effect, while amino alcohols increase the viscosities. Curing agents H5 react spontaneously with the viscosity modifiers from the group of the esters, anhydrides and amino alcohols, and viscosities, gel times and latencies therefore cannot be measured.

However, the various viscosity modifiers have an extraordinarily great effect both on the storage stabilities (latencies) of the various epoxy resin/curing agent mixtures and on their reactivity. In the case of curing agents H5, monohydric alcohols, dihydric alcohols, aldehydes and nitriles reduce the latencies to half, while trihydric alcohols, ketones and ethers more than triple the latencies. The latencies of the epoxy resin/H6 mixtures behave inconsistently; dihydric alcohols and nitriles here also triple the storage stabilities.

The gel times give information about the reactivity of the epoxy resin/curing agent mixtures. It is noticeable that viscosity modifiers reduce the gel times and others can increase them. Monohydric and dihydric alcohols generally accelerate the reaction, while trihydric alcohols, ketones and ethers retard it. Aldehydes and nitriles accelerate reactions of the curing agents H5, while they retard the reactions of the curing agents H6. In the case of H6, esters and anhydrides also have a retarding effect, while amino alcohols naturally accelerate the reactions but without spontaneously reacting.

If the composition of the viscosity-modified liquid curing agents is modified with imidazoles, further reductions of the gel times and thus an increase in the reactivity can be observed, but this is accompanied in all cases by considerable increases in the viscosities and storage stabilities (latencies).

By comparison, the known and conventional liquid amine curing agents such as RIMH 137 (Momentiv Specialty Chemicals) or IPDA (Evonik Degussa GmbH) exhibit lower curing temperatures, but the mixtures according to the invention begin the polymerisation at comparable times and achieve far higher glass transition temperatures, but have a far greater latency.

By using viscosity modifiers and imidazoles in the viscosity-modified liquid curing agents according to the invention, a large number of particular property profiles of these liquid curing agents is achieved, as are required in many applications in the composites field. Owing to this wide range of properties, the viscosity-modified liquid curing agents according to the invention can be adapted individually to almost all requirements.

TABLE 5

Infusion test with epoxy resin compositions according to Table 4

| Epoxy resin composition | Injection time in minutes | Curing time in h Temperature in ° C. | Cold $T_g$ | End $T_g$ | Comments |
|---|---|---|---|---|---|
| E2 | 4 | 4 h 78°-80° C. | 116 | 118 | Fibre composite readily removable from core Fibre composite has a good appearance, is even, has no defects |

TABLE 5-continued

Infusion test with epoxy resin compositions according to Table 4

| Epoxy resin composition | Injection time in minutes | Curing time in h Temperature in ° C. | Cold $T_g$ | End $T_g$ | Comments |
|---|---|---|---|---|---|
| E20 | 4 | 6 h 88°-90° C. | 120 | 126 | Fibre composite readily removable from core<br>Fibre composite has a good appearance, is even, has no defects |
| E30 | 4 | 2 h 78°-80° C. | 118 | 121 | Fibre composite readily removable from core<br>Fibre composite has a good appearance, is even, has no defects |

TABLE 6

Fibre composite-set-up for infusion tests

| Component | Material |
|---|---|
| Base layer | R&G vacuum film no. 390160 |
| Sealant | Tacky tape SM5126-1/2" × X1/8" |
| Separating film (bottom) | Nylon peel ply (plain weave 64 g/m³) offset |
| Laminate (glass fibre) | 5-layer Atlas FK 144 (296 g/m³) |
| Separating film (top) | Nylon peel ply (plain weave 64 g/m³) offset |
| Release film | R&G release film no. 390190 |
| Aerating film | R&G nonwoven no. 390180 |
| Vacuum mesh | Deaerating mesh 150 g/m³ (running direction-black) |
| Vacuum film | R&G vacuum film no. 390160 |
| Hoses (inlet and outlet) | Teflon, (4.0 mm inside ⌀, 5.0 mm outside ⌀)<br>PVC, clear (6.0 mm inside ⌀, 7.0 mm outside ⌀) |
| Support | Glass plate |
| Mould: | Hot plate |
| Storage vessel: | Glass beaker |
| Vacuum: | Standard vacuum pump (15-20 mbar) |

Test Procedure:

Epoxy resin compositions E2, E20 are mixed and preheated in a heatable storage vessel. The feed hose is introduced into the storage vessel and fixed, the outlet hose (see set-up of an infusion test, Table 5) is connected to the vacuum pump by way of a safety valve, the pump is switched on. The hot plate (which simulates the heatable mould) is brought to the infusion temperature. With the application of the vacuum, the epoxy resin composition is drawn through the fibre composite. When impregnation is complete, the inlet and outlet hoses are clamped and capped, and the entire set-up then cures on the hot plate to form a laminate. When curing and cooling are complete, the laminate is removed from the set-up.

The invention claimed is:

1. A liquid curing agent for curing polymer resins, comprising:
   a) cyanamide;
   b) at least one urea derivative of formula (I)

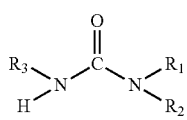

Formula (I)

wherein
R¹ and R² are each independently selected from the group consisting of hydrogen, C1- to C15-alkyl, and C3- to C15-cycloalkyl; or R¹ and R² together are C3- to C10-alkylene, thereby forming a ring together with the nitrogen atom to which they are attached;

R3 is selected from the group consisting of hydrogen, C1- to C15-alkyl, C3- to C15-cycloalkyl, aryl, arylalkyl, C1- to C15-alkyl substituted by —NHC(O)NR¹R², C3- to C15-cycloalkyl substituted by —NHC(O)NR¹R², aryl substituted by —NHC(O)NR¹R², and arylalkyl substituted by —NHC(O)NR¹R²;

provided that at least one of R¹, R², and R³ is not hydrogen; and c) at least one curing accelerator selected from the group consisting of imidazolines according to formula (II) and imidazoles according to formula (III)

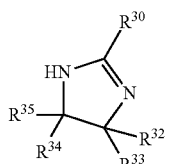

Formula (II)

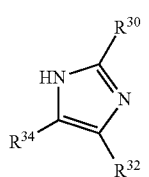

Formula (III)

wherein

R³⁰ is selected from the group consisting of hydrogen, C1- to C15-alkyl, C3- to C15-cycloalkyl, aryl, and arylalkyl;

R³² and R³⁴ are each independently selected from the group consisting of hydrogen, C1- to C15-alkyl, and C3- to C15-cycloalkyl; or R³² and R³⁴ together are C3- to C15-alkylene, thereby forming a ring together with the carbon atoms to which they are attached;

R³³ and R³⁵ are each independently selected from the group consisting of hydrogen, C1-to C15-alkyl, and C3- to C15-cycloalkyl; or R³³ and R³⁵ together are C3- to C15-alkylene, thereby forming a ring together with the carbon atoms to which they are attached.

2. The liquid curing agent of claim 1, wherein the cyanamide and the at least one urea derivative of formula (I) are provided in a molar ratio of from 1:1 to 4:1.

3. The liquid curing agent of claim 2, wherein $R^3$ is represented by the general formula (V),

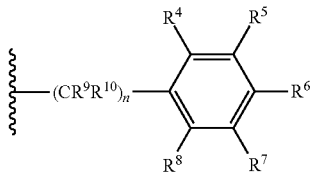

(Formula V)

wherein $R^1$ and $R^2$ are each independently selected from the group consisting of hydrogen, C1- to C15-alkyl, and C3- to C15-cycloalkyl; or $R^1$ and $R^2$ together are C3- to C10-alkylene, thereby forming a ring together with the nitrogen atom to which they are attached;
$R^4$, $R^5$, $R^6$, $R^7$ and $R^8$ are each independently selected from the group consisting of hydrogen, halogen, C1- to C15-alkyl, C3- to C15-cycloalkyl, aryl, arylalkyl, —CF$_3$, —NHC(O)NR$^1$R$^2$, C1- to C15-alkyl substituted by —NHC(O)NR$^1$R$^2$, aryl substituted by —NHC(O)NR$^1$R$^2$, and arylalkyl substituted by —NHC(O)NR$^1$R$^2$;
$R^9$ and $R^{10}$ are each independently selected from the group consisting of hydrogen and C1- to C15-alkyl;
n is a number between 0 and 10.

4. The liquid curing agent of claim 1, wherein $R^3$ is represented by the general formula (V),

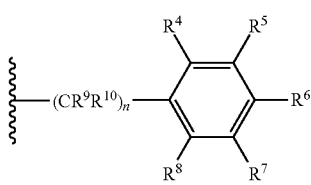

(Formula V)

wherein $R^1$ and $R^2$ are each independently selected from the group consisting of hydrogen, C1- to C15-alkyl, and C3- to C15-cycloalkyl; or $R^1$ and $R^2$ together are C3- to C10-alkylene, thereby forming a ring together with the nitrogen atom to which they are attached;
$R^4$, $R^5$, $R^6$, $R^7$ and $R^8$ are each independently selected from the group consisting of hydrogen, halogen, C1- to C15-alkyl, C3- to C15-cycloalkyl, aryl, arylalkyl, —CF$_3$, —NHC(O)NR$^1$R$^2$, C1 to C15-alkyl substituted by —NHC(O)NR$^1$R$^2$, aryl substituted by —NHC(O)NR$^1$R$^2$, and arylalkyl substituted by —NHC(O)NR$^1$R$^2$;
$R^9$ and $R^{10}$ are each independently selected from the group consisting of hydrogen and C1- to C15-alkyl;
n is a number between 0 and 10.

5. The liquid curing agent of claim 1, wherein
$R^1$ and $R^2$ are each independently selected from the group consisting of hydrogen and C1- to C15-alkyl; and
$R^3$ is selected from the group consisting of hydrogen, C1-C15-alkyl, C3- to C15-cycloalkyl, C1- to C15-alkyl substituted by —NHC(O)NR$^1$R$^2$, and C3- to C15-cycloalkyl substituted by —NHC(O)NR$^1$R$^2$.

6. The liquid curing agent of claim 1, wherein the at least one urea derivative according to formula (I) is selected from the group consisting of 1-methylurea, 1,1-dimethylurea, 1,3-dimethylurea, 3-(3-chloro-4-methylphenyl)-1,1-dimethylurea, 3-(p-chlorophenyl)-1,1-dimethylurea, 3-phenyl-1,1-dimethylurea, 3-(3,4-dichlorophenyl)-1,1-dimethylurea, 1,1'-(methylenedi-p-phenylene)-bis-(3,3-dimethylurea), 3-(3-trifluoromethylphenyl)-1,1-dimethylurea, 1,1'-(2-methyl-m-phenylene) -bis-(3,3-dimethylurea), 1,1'-(4-methyl-m-phenylene)-bis-(3,3-dimethylurea), and mixtures thereof.

7. The liquid curing agent of claim 1, wherein
$R^{30}$ is selected from the group consisting of hydrogen, methyl, ethyl, propyl, butyl, pentyl, hexyl, heptyl, octyl, nonyl, decanyl and phenyl;
$R^{32}$ and $R^{34}$ are each independently selected from the group consisting of hydrogen, C1- to C5-alkyl and phenyl; and
$R^{33}$ and $R^{35}$ are each independently selected from the group consisting of hydrogen, C1- to C5-alkyl and phenyl.

8. The liquid curing agent of claim 1, wherein the curing agent further comprises d) at least one viscosity modifier selected from the group consisting of the monools, diols, polyols, ethers, polyethers, polyether polyols, ketones, aldehydes, nitriles, carboxylic acid esters, and mixtures thereof.

9. The liquid curing agent of claim 1, wherein the curing agent further comprises d) at least one viscosity modifier selected from the group consisting of the monools, diols, polyols, ethers, ether alcohols, polyethers, polyether polyols, and mixtures thereof according to the general formula (VII),

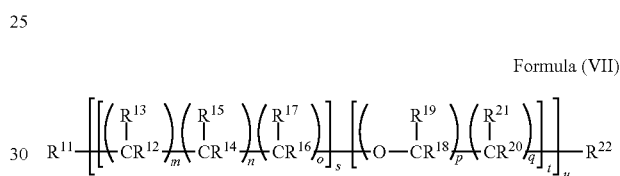

Formula (VII)

wherein
$R^{11}$ and $R^{22}$ are each independently selected from the group consisting of hydrogen, —OH, and C1- to C15-alkyl;
$R^{12}$, $R^{14}$, $R^{16}$, $R^{18}$ and $R^{20}$ are each independently selected from the group consisting of hydrogen, —OH, and C1- to C5-alkyl;
$R^{13}$, $R^{15}$, $R^{17}$, $R^{19}$ and $R^{21}$ are each independently selected from the group consisting of hydrogen, —OH, —NH$_2$, and C1- to C5-alkyl;
u is a number from 1 to 10;
s and t are independently a number from 0 to 10, provided that at least one of s and t is a number from 1 to 10;
m is a number from 0 to 10, provided that m is a number from 1 to 10 when s is a number 1 to 10;
p is a number from 0 to 10, provided that p is a number from 1 to 10 when t is a number from 1 to 10;
n, o and q are independently a number from 0 to 10.

10. The liquid curing agent of claim 1, wherein the curing agent further comprises e) a stabiliser selected from the group of inorganic and organic acids.

11. The liquid curing agent of claim 1, wherein the curing agent further comprises e) a stabiliser selected from the group consisting of salicylic acid, phthalic acid, toluenesulfonic acid, sulfuric acid, phosphoric acid, anhydrides thereof, and mixtures thereof.

12. The liquid curing agent of claim 1, wherein the curing agent comprises:
from 1 to 50 parts by weight of the cyanamide;
from 1 to 50 parts by weight of the at least one urea derivative of formula (I); and
from 0.01 to 50 parts by weight of the at least one curing accelerator selected from the group consisting of the imidazolines of formula (II) and of the imidazoles of formula (III).

13. The liquid curing agent of claim 1, further comprising from 0 to 10 parts by weight of at least one viscosity modifier; and
from 0 to 10 parts by weight of at least one stabiliser.

14. An epoxy resin composition comprising:
a) at least one curable epoxy resin; and
b) the liquid curing agent of claim 1.

15. A polyurethane resin composition comprising:
a) at least one curable polyurethane resin; and
b) the liquid curing agent of claim 1.

16. A composite material comprising:
a) a carrier material;
b) at least one of a curable epoxy resin and a curable polyurethane resin; and
c) the liquid curing agent of claim 1.

17. The composite material of claim 16, wherein the carrier material is a fibre material.

18. A method of making a composite material comprising: impregnating a carrier material with a curable composition; and curing the impregnated carrier material; wherein the carrier material is selected from the group consisting of woven fabrics, knitted fabrics and meshes; and wherein the curable composition comprises a curable polymer resin and the liquid curing agent of claim 1.

19. The method of claim 18, wherein the curable polymer resin is at least one of a curable epoxy resin and a curable polyurethane resin.

20. A liquid curing agent for curing epoxy resins comprising:
a) cyanamide;
b) at least one urea derivative of formula (I)

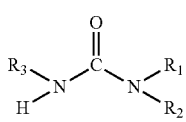

Formula (I)

wherein
$R^1$ and $R^2$ are each independently selected from the group consisting of hydrogen, C1- to C15-alkyl, and C3- to C15-cycloalkyl; or $R^1$ and $R^2$ together are C3- to C10-alkylene, thereby forming a ring together with the nitrogen atom to which they are attached;

$R^3$ is selected from the group consisting of hydrogen, C1- to C15-alkyl, C3- to C15-cycloalkyl, aryl, arylalkyl, C1- to C15-alkyl substituted by —NHC(O)NR¹R², C3- to C15-cycloalkyl substituted by —NHC(O)NR¹R², aryl substituted by —NHC(O)NR¹R², and arylalkyl substituted by —NHC(O)NR¹R²;

provided that at least one of $R^1$, $R^2$ and $R^3$ is not hydrogen; and c) at least one curing accelerator selected from the group consisting of imidazolines according to formula (II) and imidazoles according to formula (III)

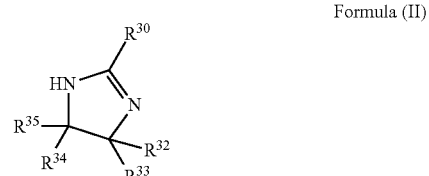

Formula (II)

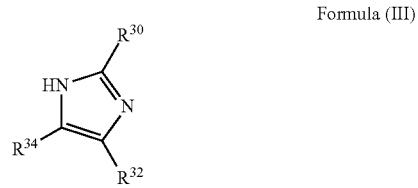

Formula (III)

wherein:

$R^{30}$ is selected from the group consisting of hydrogen, C1- to C15-alkyl, C3- to C15-cycloalkyl, aryl, and arylalkyl;

$R^{32}$ and $R^{34}$ are each independently selected from the group consisting of hydrogen, C1- to C15-alkyl, and C3- to C15-cycloalkyl; or $R^{32}$ and $R^{34}$ together are C3- to C15-alkylene, thereby forming a ring together with the carbon atoms to which they are attached;

$R^{33}$ and $R^{35}$ are each independently selected from the group consisting of hydrogen, C1- to C15-alkyl, and C3- to C15-cycloalkyl; or $R^{33}$ and $R^{35}$ together are C3- to C15-alkylene, thereby forming a ring together with the carbon atoms to which they are attached.

* * * * *